(12) United States Patent
Calder et al.

(10) Patent No.: US 10,127,295 B2
(45) Date of Patent: Nov. 13, 2018

(54) GEOGRAPHIC CO-LOCATION SERVICE FOR CLOUD COMPUTING

(75) Inventors: Bradley Gene Calder, Bellevue, WA (US); Vikram Dhaneshwar, Redmond, WA (US); Sriram Krishnan, Seattle, WA (US); Ju Wang, Redmond, WA (US); Samuel James McKelvie, Seattle, WA (US); Zhe Yang, Redmond, WA (US)

(73) Assignee: MICROSOFT TECHNOLOFY LICENSING, LLC, Redmond, WA (US)

( * ) Notice: Subject to any disclaimer, the term of this patent is extended or adjusted under 35 U.S.C. 154(b) by 684 days.

(21) Appl. No.: 12/479,195

(22) Filed: Jun. 5, 2009

(65) Prior Publication Data
US 2010/0312809 A1 Dec. 9, 2010

(51) Int. Cl.
G06F 17/30 (2006.01)
G06F 9/50 (2006.01)

(52) U.S. Cl.
CPC ...... *G06F 17/30575* (2013.01); *G06F 9/5072* (2013.01)

(58) Field of Classification Search
CPC .................................. G06F 17/00; G06F 17/30
See application file for complete search history.

(56) References Cited

U.S. PATENT DOCUMENTS

| | | |
|---|---|---|
| 4,260,579 A | 4/1981 | Barton et al. |
| 4,304,488 A | 12/1981 | Asakura et al. |
| 4,354,213 A | 10/1982 | Martinelli |
| 4,355,018 A | 10/1982 | Hansen et al. |
| 4,403,038 A | 9/1983 | Asakura et al. |
| 4,415,982 A | 11/1983 | Nishikawa |
| 4,419,164 A | 12/1983 | Martinelli |
| 4,432,057 A | 2/1984 | Daniell et al. |
| 4,488,991 A | 12/1984 | Tolman et al. |

(Continued)

OTHER PUBLICATIONS

Elias Koutsoupias and Christos Papadimitriou, "Worst-Case Equilibria," STACS '99, Lecture Notes in Computer Science, vol. 1563, pp. 401-413.*

(Continued)

*Primary Examiner* — Farhan Syed
(74) *Attorney, Agent, or Firm* — Shook, Hardy & Bacon, L.L.P.

(57) ABSTRACT

Embodiments of the present invention relate to systems, methods, and computer storage media for geographically organizing the storage of data and hosted services in a distributed computing environment. An allocation constraint is utilized to identify and select a geo-region in which an affinity group that is comprised of a hosted service and/or data is to be physically stored. Additionally, a geo-domain within the geo-region is identified for hosting the hosted service and/or data of the affinity group. A stamp, such as a storage stamp or a computation stamp, is identified on the geo-domain for storing the hosted service and/or the data. The hosted service is stored in an identified computation stamp and the data is stored in an identified storage stamp. In an additional exemplary embodiment, the identification of a geo-domain involves analyzing resource information related to potential geo-domains within a geo-region.

12 Claims, 9 Drawing Sheets

(56) References Cited

U.S. PATENT DOCUMENTS

| | | | |
|---|---|---|---|
| 4,502,910 A | 3/1985 | Voltmer et al. | |
| 4,562,292 A | 12/1985 | Hammock et al. | |
| 4,564,596 A | 1/1986 | Maximenko et al. | |
| 4,609,593 A | 9/1986 | Nakashima et al. | |
| 4,613,947 A | 9/1986 | Suzuka et al. | |
| 4,809,157 A | 2/1989 | Eilert et al. | |
| 4,815,025 A | 3/1989 | Ossfeldt et al. | |
| 5,303,214 A | 4/1994 | Kulakowski et al. | |
| 5,347,651 A | 9/1994 | Burke et al. | |
| 5,481,691 A | 1/1996 | Day et al. | |
| 5,506,987 A | 4/1996 | Abramson et al. | |
| 5,535,393 A | 7/1996 | Reeve | |
| 5,546,557 A | 8/1996 | Allen et al. | |
| 5,679,523 A * | 10/1997 | Li et al. | 435/6.12 |
| 5,732,387 A * | 3/1998 | Armbruster et al. | 455/13.2 |
| 5,734,861 A | 3/1998 | Cohn et al. | |
| 5,887,257 A * | 3/1999 | Olds | 455/427 |
| 6,020,139 A | 2/2000 | Schwartz et al. | |
| 6,026,913 A * | 2/2000 | Mandal et al. | 175/45 |
| 6,151,643 A * | 11/2000 | Cheng et al. | 710/36 |
| 6,185,407 B1 * | 2/2001 | Watson | 455/9 |
| 6,195,682 B1 | 2/2001 | Ho et al. | |
| 6,239,763 B1 * | 5/2001 | Cuchanski | 343/781 P |
| 6,312,779 B1 * | 11/2001 | Hirotsune et al. | 428/64.1 |
| 6,427,227 B1 * | 7/2002 | Chamberlain | 717/124 |
| 6,434,744 B1 * | 8/2002 | Chamberlain et al. | 717/168 |
| 6,522,628 B1 * | 2/2003 | Patel et al. | 370/230.1 |
| 6,816,905 B1 | 11/2004 | Sheets | |
| 7,062,279 B2 * | 6/2006 | Cedervall et al. | 455/456.3 |
| 7,082,603 B2 * | 7/2006 | Hisatake | 717/173 |
| 7,126,913 B1 * | 10/2006 | Patel et al. | 370/230.1 |
| 7,385,500 B2 * | 6/2008 | Irwin | 340/539.13 |
| 7,506,259 B1 * | 3/2009 | Narayanaswami et al. | 715/734 |
| 7,546,486 B2 * | 6/2009 | Slik | G06F 17/30171 707/999.103 |
| 7,738,837 B2 * | 6/2010 | Karabinis | 455/12.1 |
| 8,364,720 B2 * | 1/2013 | Levy | G06F 17/3002 382/100 |
| 8,886,796 B2 * | 11/2014 | Calder | H04L 67/1002 709/224 |
| 2003/0018987 A1 * | 1/2003 | Surani | 800/9 |
| 2003/0040324 A1 * | 2/2003 | Eldering et al. | 455/456 |
| 2003/0065762 A1 * | 4/2003 | Stolorz et al. | 709/223 |
| 2004/0103195 A1 | 5/2004 | Chalasani | |
| 2004/0203900 A1 * | 10/2004 | Cedervall et al. | 455/456.1 |
| 2005/0242999 A1 * | 11/2005 | McCarrick | 343/700 MS |
| 2006/0064478 A1 * | 3/2006 | Sirkin | 709/223 |
| 2006/0112170 A1 * | 5/2006 | Sirkin | 709/217 |
| 2006/0189275 A1 * | 8/2006 | Karabinis | 455/12.1 |
| 2006/0192673 A1 * | 8/2006 | Irwin | 340/539.13 |
| 2007/0043860 A1 * | 2/2007 | Pabari | G06F 9/5072 709/224 |
| 2007/0156726 A1 * | 7/2007 | Levy | G06F 17/3002 |
| 2007/0192352 A1 * | 8/2007 | Levy | G06F 17/3002 |
| 2007/0208711 A1 * | 9/2007 | Rhoads | G06F 17/3002 |
| 2007/0283282 A1 | 12/2007 | Bonfiglio | |
| 2008/0080552 A1 * | 4/2008 | Gates | H04L 12/66 370/468 |
| 2008/0276234 A1 | 11/2008 | Taylor | |
| 2009/0070337 A1 * | 3/2009 | Romem | G06F 17/30457 |
| 2009/0119394 A1 * | 5/2009 | Winkler | 709/223 |
| 2009/0172033 A1 * | 7/2009 | Clark et al. | 707/104.1 |
| 2010/0076933 A1 * | 3/2010 | Hamilton et al. | 707/640 |
| 2010/0106934 A1 * | 4/2010 | Calder | G06F 3/0605 711/173 |
| 2010/0312809 A1 * | 12/2010 | Calder et al. | 707/912 |
| 2011/0093522 A1 * | 4/2011 | Chen et al. | 709/203 |
| 2013/0198242 A1 * | 8/2013 | Levy | G06F 17/3002 707/803 |
| 2014/0258499 A9 * | 9/2014 | Calder | H04L 67/1002 709/224 |

OTHER PUBLICATIONS

"Geo Location Enables Developers to Choose Data Centers and Group Applications & Storage," Mar. 18, 2009, pp. 1-2, http://blogs.msdn.com/windowsazure/archive/2009/03/18/geo-location-enables-developers-to-choose-data-centers-and-group-applications-storage.aspx.

Prabhakar Chaganti, "Cloud computing with Amazon Web Services, Part 2: Storage in the cloud with Amazon Simple Storage Service (S3)," Aug. 19, 2008, pp. 1-13, http://www.ibm.com/developerworks/library/ar-cloudaws2/.

Broberg, James, et al., "Creating a 'Cloud Storage' Mashup for High Performance, Low Cost Content Delivery," Apr. 6, 2009, pp. 178-183, Department of Computer Science and Software Engineering, The University of Melbourne, Australia, http://www.gridbus.org/papers/CloudStorage-ICSOC-2008.pdf.

"The Planet Introduces New Cloud Storage Service," pp. 1-4, Nov. 28, 2008, http://webhostinggeeks.com/blog/2008/11/28/the-planet-introduces-new-cloud-storage-service/.

"The Availability Digest—Can You Trust the Compute Cloud" pp. 1-6, Aug. 2008, http://www.availabilitydigest.com/public_articles/0308/amazon.pdf.

Broberg, James et al., "MetaCDN: Harnessing 'Storage Clouds' for high performance content delivery", pp. 1-13, Apr. 6, 2009, Department of Computer Science and Software Engineering, The University of Melbourne, Australia, http://www.gridbus.org/reports/meta-cdn2008.pdf.

Fishteyn, Daniil, "Deploying Software as a Service (SaaS)", pp. 1-11, Apr. 6, 2009, http://www.siia.net/ondemand/2008/saas.com_whitepaper_part1.pdf.

Crump, George, "Cloud Storage's Killer App . . . Geographic Collaboration", Feb. 10, 2009, pp. 1-3, http://www.informationweek.com/blog/main/archives/2009/02/cloud_storages_1.html.

"Data Center Co-Locations Services" pp. 1-2, Apr. 3, 2009, http://www.ptsdcs.com/datacentercolo.asp.

Pairault, Remy, et al., "Utilizing Affinity Groups to Allocate Data Items and Computing Resources," U.S. Appl. No. 12/479,525, filed Jun. 5, 2009.

Office Action in U.S. Appl. No. 12/479,525 dated Aug. 3, 2011, 23 pages.

Final Office Action dated Jan. 13, 2012 re U.S. Appl. No. 12/479,525, 21 pgs.

Non-Final Office Action dated Feb. 7, 2013 re U.S. Appl. No. 12/479,525, 76 pgs.

Notice of Allowance and Fee(s) Due dated Jul. 8, 2013 in U.S. Appl. No. 12/479,525; 48 pages.

* cited by examiner

EXEMPLARY GEO-REGIONS

GEOGRAPHIC CO-LOCATION SERVICE FOR CLOUD COMPUTING

CROSS-REFERENCE TO RELATED APPLICATIONS

This application is related by subject matter to the invention disclosed in the commonly assigned application U.S. application Ser. No. 12/479,525 filed on even date herewith, entitled "UTILIZING AFFINITY GROUPS TO ALLOCATE DATA ITEMS AND COMPUTING RESOURCES."

BACKGROUND

Cloud computing allows for hosted services and resources necessary to operate some of the hosted service to be located at a remote location from the user of the cloud computing hosted service. The remote location may be geographically separated from the user by a few miles or a few continents. Additionally, a hosted service additionally is associated with data used in conjunction with the hosted service. Therefore, the user, the hosted service, and the data all may be geographically separate from one another. Resources required to operate a hosted service may increase with distance between the user, hosted service, and data.

SUMMARY

Embodiments of the present invention relate to systems, methods and computer storage media for geographically organizing the storage of data and hosted services in a distributed computing environment. An allocation constraint is utilized to identify and select a geo-region in which an affinity group comprised of a hosted service and/or data is to be physically stored. Additionally, a geo-domain within the geo-region is identified for hosting the hosted service and/or data of the affinity group. A stamp, such as a storage stamp or a computation stamp, is identified on the geo-domain for storing the hosted service as a computation account and/or the data as a storage account. The hosted service is stored at the geo-domain in the identified computation stamp and the data is stored at the geo-domain in the identified storage stamp.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for geographically organizing the storage of data and hosted services in a distributed computing environment. An allocation constraint is utilized to identify and select a geo-region in which an affinity group comprised of a hosted service and/or data is to be physically stored. Additionally, a geo-domain within the geo-region is identified for hosting the hosted service and/or data of the affinity group. A stamp, such as a storage stamp or a computation stamp, is identified on the geo-domain for storing the hosted service as a computation account and/or the data as a storage account. The hosted service is stored at the geo-domain in the identified computation stamp and the data is stored at the geo-domain in the identified storage stamp.

Accordingly, in one aspect, the present invention provides a method utilizing a computing processor and memory for geographically organizing the storage of data and hosted services in a distributed computing environment. The method includes receiving one or more allocation constraints for an affinity group. The method also includes identifying a geo-domain in which to physically store an account, wherein the account is associated with the affinity group. The method also includes identifying a stamp of the geo-domain. The method additionally includes storing the account in the storage stamp.

In another aspect, the present invention provides a system for geographically organizing the storage of data and hosted services in a distributed computing environment. The system includes a co-location determination device having a processor and memory for identifying a first geo-domain to store the data and a second geo-domain to store the hosted service. The system also includes a geo-domain having a processor and memory that stores an account in a data store having one or more stamps. Additionally, the system includes a computation location device having a processor and memory that provides a computation location service. Further, the system includes a storage location device having a processor and memory that provides a storage location service. The system also includes a network in communication with the co-location determination device, the geo-domain, the computation location device, and the storage location device.

A third aspect of the present invention provides computer storage media having computer-executable instructions embodied thereon for performing a method for organizing the storage of data and hosted services in a distributed computing environment. The method includes receiving a request to create an affinity group. The affinity group will have at least one storage account and at least one computation account. The method also includes receiving a request to add a storage account and a computation account to the affinity group. The method additionally includes determining a geo-domain for physically storing the storage account and the computation account, wherein the geo-domain is determined by a co-location determination device. The co-location determination device utilizes information to determine the geo-domain is to be used for physically storing the storage account and the computation account. The information includes information provided by one or more computation location services associated with one or more geo-domains; information provided by one or more storage location services associated with one or more geo-domains; and one or more allocation constraints associated with the affinity group. The method also includes selecting the geo-domain for storing the storage account and the computation account. The method additionally includes determining, at a computation location service of the geo-domain, a stamp within the geo-domain for storing the computation account. The method also includes determining, at a storage location service of the geo-domain, a stamp within the geo-domain for storing the storage account.

Having briefly described an overview of embodiments of the present invention, an exemplary operating environment suitable for implementing embodiments hereof is described below.

Figure 1:
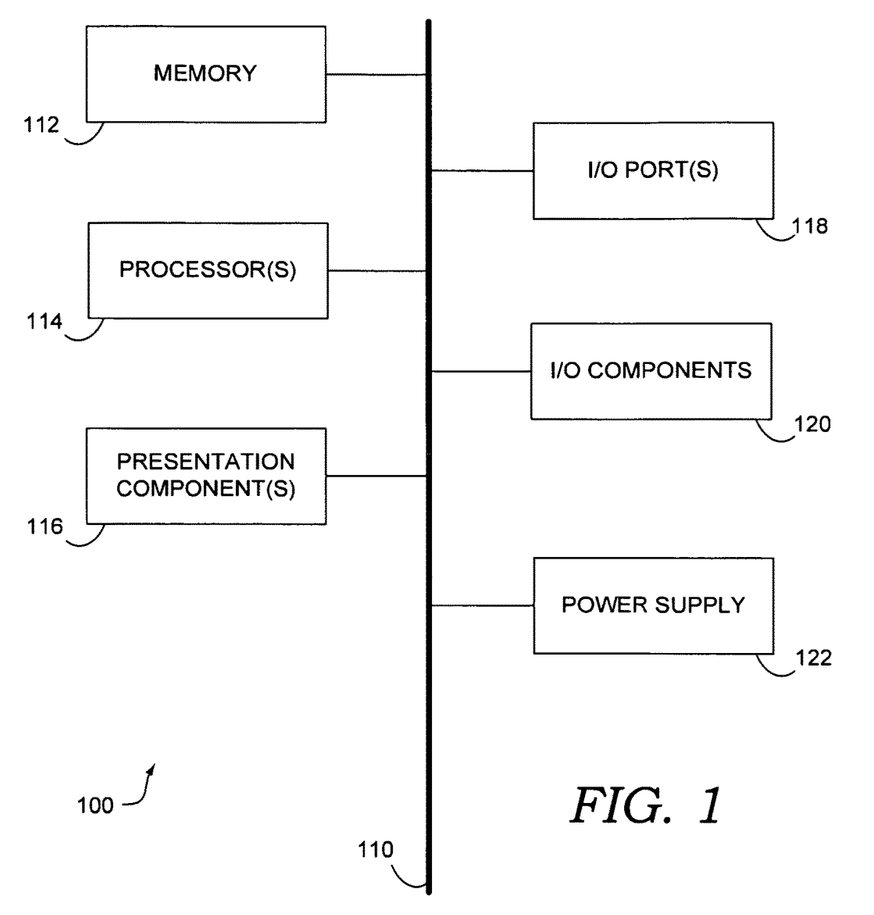
FIG. 1 depicts an exemplary computing device suitable for implementing embodiments of the present invention.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EE-PROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
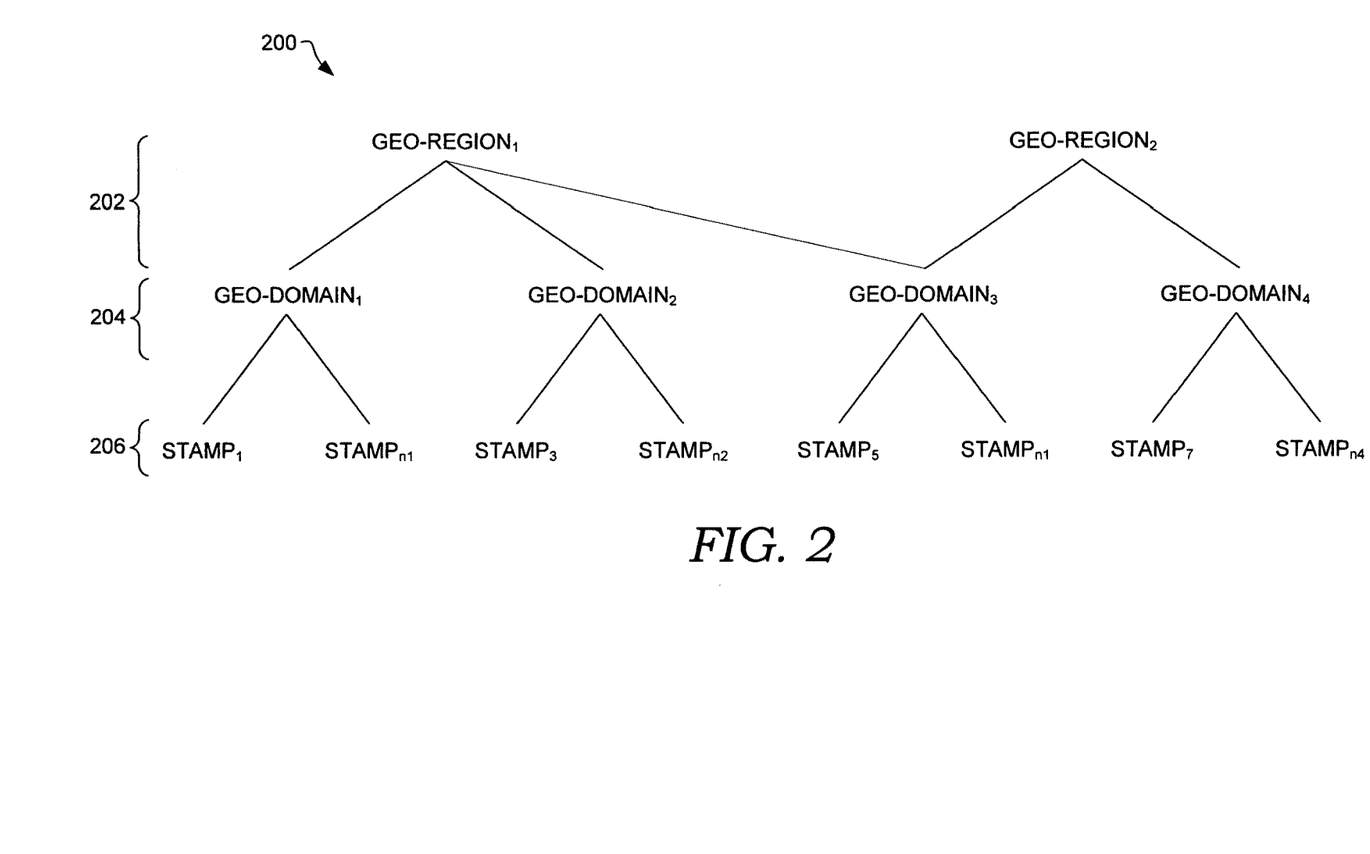
FIG. 2 depicts an overview hierarchical structure for organizing data and hosted services in a distributed computing environment that is suitable for implementing embodiments of the present invention.

With reference to FIG. 2, a diagram is provided illustrating an exemplary geo-location hierarchy 200 in which embodiments of the present invention may be employed. The geo-location hierarchy 200 includes a geo-region level 202. The geo-region level 202 includes a number of geo-regions (e.g., geo-region 1 and geo-region 2). The geo-region level 202 will be discussed in greater detail hereinafter at FIG. 3 and FIG. 4. A geo-domain level 204 includes a number of geo-domains (e.g., geo-domain 1, geo-domain 2, geo-domain 3, geo-domain 4). The geo-domain level 204 will be discussed in greater detailed hereinafter at FIG. 5. A stamp level 206 includes a number of stamps (e.g., stamp 1, stamp 2, stamp 7, stamp 8). The stamp level 206 will be discussed in greater detail hereinafter at FIG. 5.

The geo-location hierarchy 200 illustrates the relationship between the various levels. For example, in the embodiment illustrated at FIG. 2, each geo-region includes a number of geo-domains. Additionally, each geo-domain includes a number of stamps. Further, a geo-domain may be associated with two or more geo-regions in an exemplary embodiment. Similarly, a geo-region may be associated with one or more other geo-regions (e.g., a Pacific Northwest geo-region may be associated with a North America geo-region.). It should be understood that any number of geo-domains may be associated with a geo-region and similarly it should be understood that any number of stamps may be associated with a geo-domain. Further, it should be understood that in an exemplary embodiment, a stamp may span across a number of geo-domains and is therefore not limited to a single geo-domain. Therefore, the visual depiction provided in FIG. 2 is intended to aid in the understating of the present invention and is not intended to be limiting as to the scope of the present invention.

A geo-region is a geographic area in which a hosted service or data is preferentially located. For example, turning to FIG. 3 that illustrates a first exemplary division of geo-regions 300. The exemplary division of geo-regions 300 illustrates six geo-regions. A first geo-region 302 comprised of North America, a second geo-region 304 comprised of South America, a third geo-region 306 comprised of Europe, a fourth geo-region 308 comprised of Africa, a fifth geo-region 310 comprised of Asia, and a sixth geo-region 312 comprised of Australia.

Figure 4:
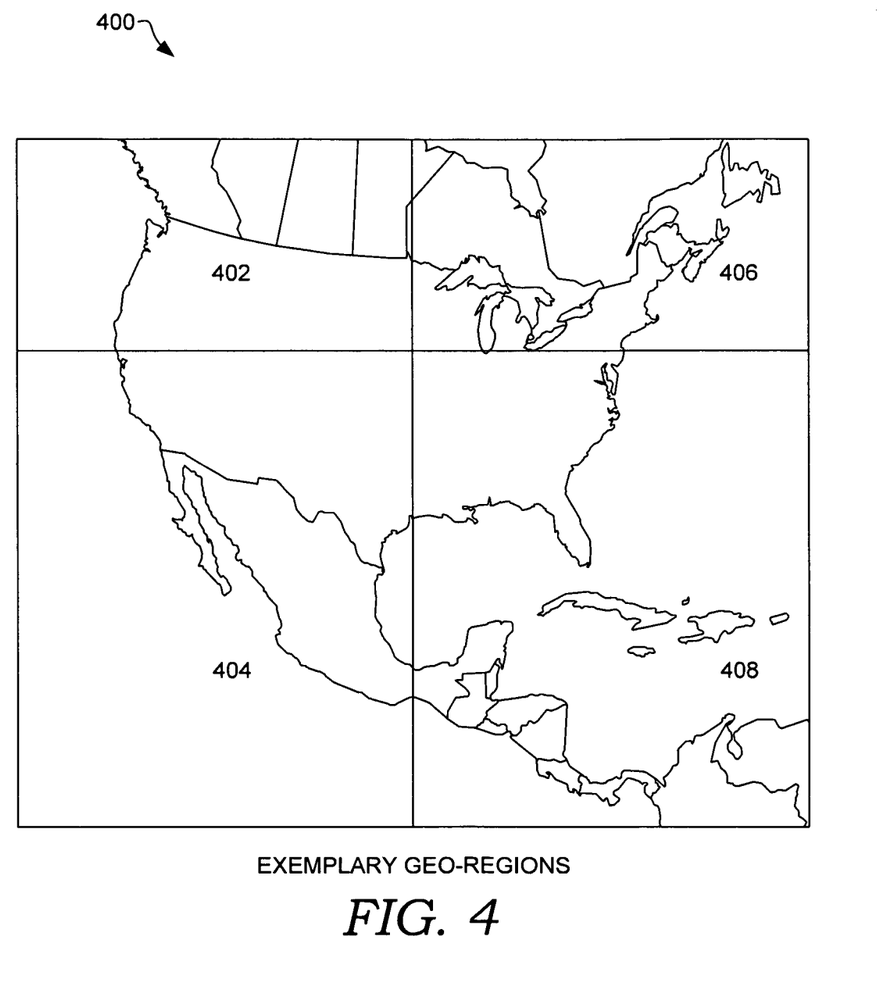
FIG. 4 depicts another graphical representation of geo-regions in accordance with an embodiment of the present invention.

Geo-regions are not limited to a predefined size, area, population, or other geo-graphic constraints. Instead, a geo-region may be an arbitrary collection of geographic spaces that facilitate geographically organizing the storage of data and hosted services in a distributed computing environment. For example, a second exemplary division of geo-regions 400 is depicted at FIG. 4. The second exemplary division of geo-regions 400 divides North America into four geo-regions. A first geo-region 402 is comprised of the northwest United States, a second geo-region 406 is comprised of the northeast United States, a third geo-region 404 is comprised of the southwest United States, and the fourth geo-region 408 is comprised of the southeast United States.

In an exemplary embodiment, a geo-region maybe contained within another geo-region. For example, a user, such as a service owner or an end user, may have an affinity for the North America geo-region 302 of FIG. 3. As a result, the user may therefore also have an affinity for any of the geo-regions depicted at FIG. 4 that are located with North America. For example, the user that has an affinity for the North America geo-region 302, may therefore also have a affinity for the geo-regions 402-408 of FIG. 4. As a result, the user may have five affinity options, on that covers the entire North America (e.g., geo-region 302 of FIG. 3) and/or the four geo regions of FIG. 4. Therefore, in an exemplary embodiment, a geo-region may include one or more other geo-regions.

Figure 3:
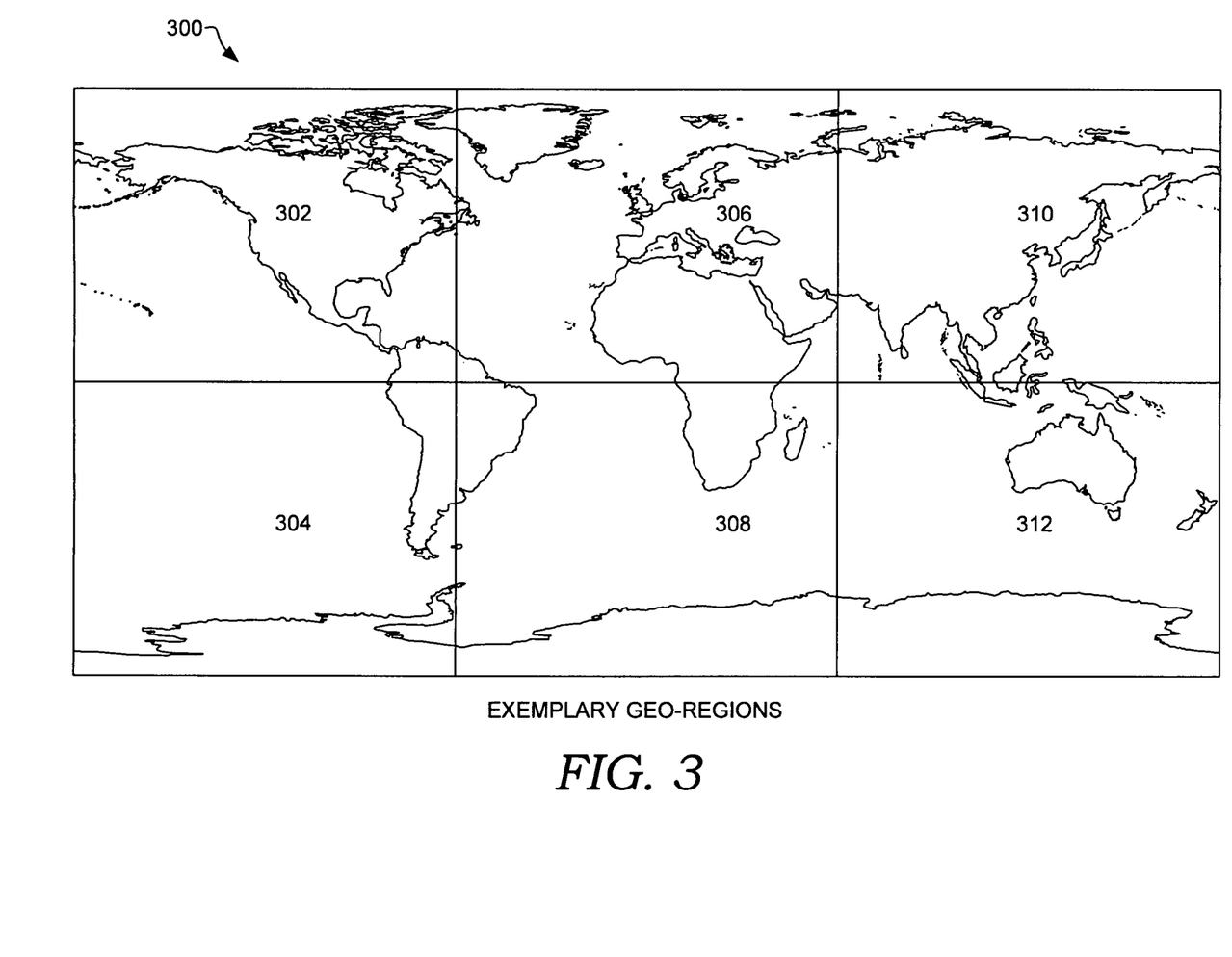
FIG. 3 depicts a graphical representation of geo-regions in accordance with an embodiment of the present invention.

A geo-region, as depicted in FIGS. 3 and 4, is not limited to a specific geographic size or political boundaries. Instead, a division of geography into geo-regions is done in such a way so as to facilitate geographically organizing the storage of data and hosted services in a distributed computing environment. Additionally, the number of geo-regions is not intended to be limited by the illustrations of FIGS. 3 and 4. Instead, it is contemplated that any number, size, and boundaries may be implemented to define one or more geo-regions for the present invention.

In an exemplary embodiment, a user, such as an end user or a service owner, of a distributed computing environment (e.g., cloud computing environment) provides information related to the location of the user. For example, the location of the user may be determined based on an Internet Protocol (IP) address, contextual determination based on information retrieved or communicated by the user, and/or through a user profile. A user may establish a user profile that indicates a geo-region or a geographic location that may be beneficial for assigning data and/or hosted services of the user to a particular geo-region. For example, the user may provide an indication that the user is primarily operating out of the geo-region 402 of FIG. 4. Therefore, in an exemplary embodiment, the user has provided an allocation constraint that indicates that the user is primarily operating out of the Pacific Northwest.

Distributed computing involves one or more services at varied geographic locations. For example, a user may operate a computing device from their home in Seattle, Wash. The user may communicate with a hosted service by way of the Internet. The hosted service is a collection of code that resides on a computing device that is separate from the user. For example, the hosted service as well as data that is used in conjunction with the hosted service, may be stored and manipulated at a server farm (e.g., data center). An advantage of a hosted service is that some of the resources required to operate the hosted service are provided by the service provider (e.g., data farm) as opposed to the user. Therefore, the user may be able to have access to services that are more powerful and resources at a lower cost than if the user attempted to perform the same functions locally. Because the resources of the service provider are utilized instead of resources of the user, it may be beneficial to reduce the resistance created by geographic disparity.

Geographic disparity is the resource distance that exists between various components, resources, and entities. For example, the farther in geographic distance two components are separated, the more complex and/or resource intensive communication between the two components becomes in a distributed computing network. Additionally, the communication of data and hosted services consumes resources of a finite capacity at a given time, such as bandwidth. Therefore, it may be advantageous to reduce the distance to improve communication, such as reducing costs associated with communication of information among geo-domains. For example, when communicating data that is used by a hosted service, bandwidth that is consumed internally at a server farm requires cheaper resources than bandwidth that is consumed between a first server farm with the data and a second server farm with the hosted service. As a result, it is advantageous for the data and the hosted service to be organized in a manner that reduces the resources necessary for the hosted service to function.

In addition to organizing the data and the hosted service to reduce the resources consumed in the communication of information between the two, it may also be beneficial to organize the data and the hosted service in a manner to reduce the resources utilized by the user. For example, if the user is in the Pacific Northwest while the data and hosted service to be used by the user are physically stored in Rome, Italy, even though the resources between the data and the hosted services may be optimized by being stored geographically close to one another, the user's interaction with the hosted service and data has not been optimized to reduce bandwidth cost and latency issues. Therefore, in an exemplary embodiment, the data (e.g., storage account) and the hosted service (e.g., computation account) are organized such that they are stored at a physical location that reduces resources (e.g., bandwidth) and reduces latency (e.g., communication time and storage access time delay) when being utilized by a user. As a result, the data and the hosted service (e.g., computation account) are stored at a geographic area that allows for the optimization of resources (e.g., in a predefined geographic proximity of the user).

In an exemplary embodiment, a user provides information to create a profile. The information may include a preferred geo-region. Additionally, the information may include information about the user in which a geo-region could be extracted through data mining techniques. Therefore, in an exemplary embodiment, the user has a geo-region to which it is associated and stored as part of the user's profile.

Additionally, a user of a distributed computing environment, such as the Microsoft Azure platform available from the Microsoft Corporation of Redmond, Wash., may allow the user to create an affinity group. An affinity group is a grouping of one or more storage accounts (e.g., data) and computation accounts (e.g., hosted service) with an assigned geographic affinity (e.g., geographic preference). The affinity group may either be assigned a geographic affinity based on a user's profile, load balancing criteria, and/or contextual information surrounding either the storage account, the computation account, or the user. In an additional embodiment, the user assigns a geographic region (i.e., geo-region) to which an affinity group is associated.

For example, as stated before, a user who lives and works in Seattle, Wash., may select a geo-region that includes Seattle, such as a Pacific Northwest geo-region. Therefore, in this example, a geo-domain located within the geo-region of the Pacific Northwest will be utilized to host data accounts and computation accounts of the user. As a result, both a data account associated with a user and a computation account associated with a user may be established geographically relative to the user. This reduces the resources required and consumed by the user using a storage account and a computation account over a cloud-computing network (e.g., distributed computing network).

An affinity group, which may consist of one or more storage accounts and/or one or more computation accounts, is assigned to one or more geo-domains by a co-location determination device. Therefore, it is contemplated that an affinity group may be comprised of one or more computation accounts. Additionally, it is contemplated that an affinity group is comprised of one or more storage accounts. For example, a service owner may establish an affinity group that is comprised of four different computation accounts. The service owner plans for the end-users to be located within the continental United States and therefore provides a constraint to the affinity group that limits the geo-region to the United States. As a result, the four different computational accounts providing four different hosted service may share an affinity group. An additional exemplary embodiment includes an end user (or a service owner) that has an affinity group that is comprised of three storage accounts. Because the three storage accounts in this example are of the same affinity group, the storage accounts may be co-located in a common geo-region or even a common geo-domain.

Utilizing affinity groups for co-location may provide benefits such as reducing latency. For example, the quality of a connection, the size of a connection, and other factors between two components, such as a computation stamp and a storage stamp, may account for latency associated with computing in a distributed computing environment. The utilization of an affinity group may reduce latency by avoiding connections of poor quality, size or other limiting factors. Utilizing an affinity groups for co-location may also provide a benefit such as reducing bandwidth consumption. While the total bandwidth consumed may not be reduce, the costs associated with the bandwidth that is consumed may be controlled with co-location and affinity groups. For example, bandwidth within a geo-domain may have lower costs than bandwidth between two geo-domains; therefore, the co-location of two resource within a particular geo-domain (or particular geo-domains) may reduce costs associated with bandwidth usage. An additional advantage that may be gained from the utilization of affinity groups for co-location includes locating components, data, and/or hosted services close to a user.

For example, a service owner may establish a hosted service and related data storage in a geo-region (e.g., Pacific Northwest) as well as a second, but similar, hosted service in a different geo-region (e.g., Central Europe). The service owner may then assign an end user to a particular hosted service based on the user's location. For example, the service owner may have an affinity for the Pacific Northwest as well as an affinity for Central Europe. As a result, a hosted service as well as associated data may then be co-located (e.g., located in relative proximity to one another) with one another based on the affinity. In this example, the service owner may then have a first hosted service co-located in one or more geo-domains within the Pacific Northwest geo-region. Additionally, in this example, the service owner may have a redundant or partitioned hosted service and related data storage co-located in one or more geo-domains within the Central Europe geo-region. The service owner may then be able to assign a user of the service (e.g., end user) to one of the hosted services based on the user's location. Additionally, the end user may also be assigned to a hosted service based on the end-user's affinity. Therefore, affinity may be utilized by both the service owner and the end user to achieve at least some of the benefits of co-location of resources.

Figure 5:
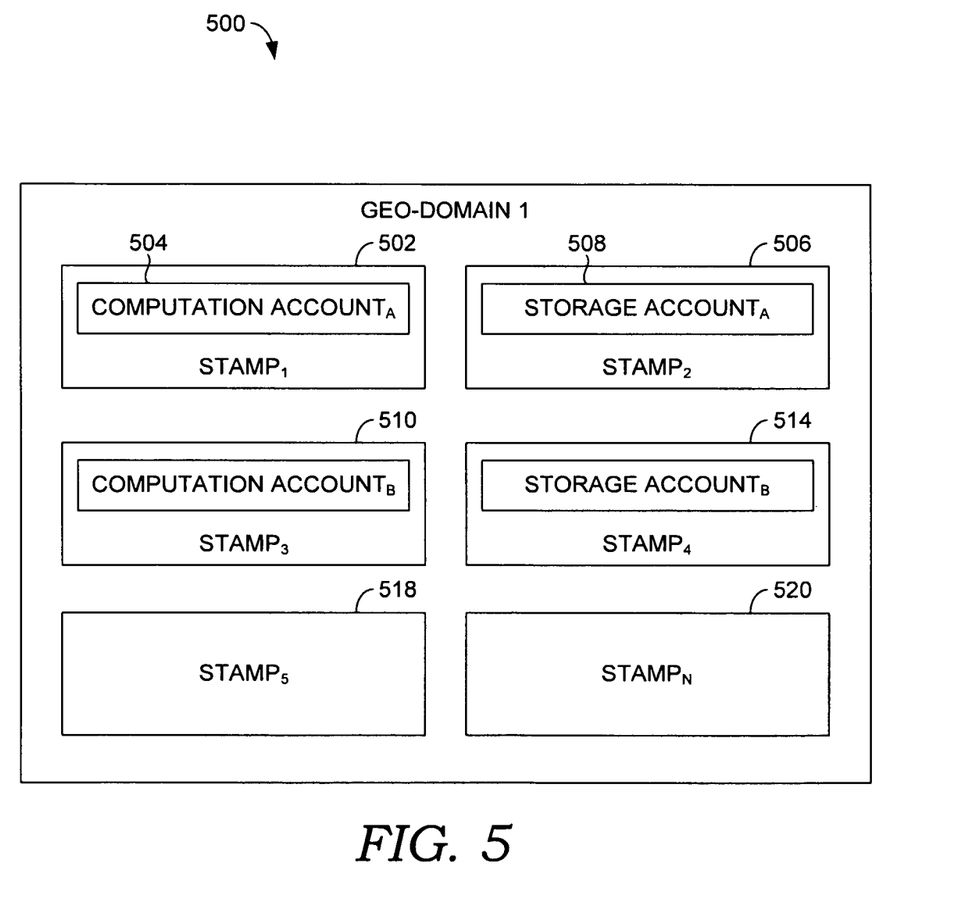
FIG. 5 depicts a block diagram illustrating a geo-domain in accordance with an embodiment of the present invention.

A geo-domain is a resource within a geo-region that may be used to host and serve one or more storage accounts and one or more computation accounts. Turning to FIG. 5 that depicts a block diagram of a geo-domain 500 in accordance with embodiments of the present invention. A geo-domain, such as the geo-domain 500, may include one or more stamps. Each stamp may consist of one or more data stores and one or more processors. A stamp may be associated with a single geo-domain or multiple geo-domains. As will be discussed hereinafter at FIG. 6, a geo-domain may be a collection of stamps, wherein a stamp may be a collection of servers and associated hardware. The geo-domain 500 is functional to include a plurality of stamps, such as a stamp 1 502, a stamp 2 506, a stamp 3 510, a stamp 4 514, a stamp 5 518, and a stamp N 520. The stamp N 520 represents that any number of stamps may be associated with a particular geo-domain. A stamp is a unit of physical storage and/or computation space within a geo-domain. In an exemplary embodiment, an account, such as a storage account or a computation account, is assigned to a particular stamp. Additionally, in an exemplary embodiment, a particular stamp is fixed at a maximum size at the time of creation of the stamp. In the alternative, in an exemplary embodiment, a stamp is not fixed to a particular size and instead may dynamically grow with demands.

In an exemplary embodiment, a stamp is a unit of space within a geo-domain that is functional to store data, such as a data for a storage account. Therefore, when a user requests an account to be created, a geo-domain is selected based on the affinity group in which the account is being created. Once the geo-domain has been selected, one or more stamps located at the geo-domain are selected to store data for the account. Continuing with this exemplary embodiment, a determination may be made as to what type of account has been requested when determining a stamp for storing the account. For example, a stamp located on a particular device (e.g., server) of the geo-domain may be better suited for storing a computation account, while a second device within the geo-domain may be better suited for storing a storage account. Therefore, depending on the type of account that has been requested, a stamp is selected. Additionally, in an exemplary embodiment, load balancing and fail-over analysis may be performed when selecting a stamp to fulfill a request.

In an additional exemplary embodiment, an account may span across multiple stamps. For example, data associated with an account may be stored at multiple geo-domains within a geo-region. Therefore, in this example, an affinity may not be limited at the account level, but instead may be at a lower level (e.g., more specific) level. For example, an affinity may be associated with element of an account, such as tables, queues, or even binary large objects (Blobs). Additionally, in an embodiment, an account, such as a storage account, may span across more than one geo-region depending on the level of detail at which the affinity is associated. For example, an affinity may be associated with table of storage account so that the tables of the storage account have an affinity for the Pacific Northwest, but Blobs of the same storage account may have an affinity for the Atlantic Southeast. In yet an additional exemplary embodiment, a stamp is utilized for both storage and computation. For example, a stamp may have both a storage account and a computation account, which may be from the same affinity group or different affinity groups.

The stamp 1 502 visually depicts the inclusion of a computation account A 504. The computation account A 504 is a computation account that is stored at the stamp 1 502. Similarly, a storage account A 508 is stored at the stamp 2 506 of the geo-domain 500. In an exemplary embodiment, the computation account A 504 and the storage account A 508 are associated with a common user that at one point requested their affinity. Therefore, the computation account A 504 is stored in a first stamp (e.g., stamp 1 502) and the storage account A 508 is stored in a second stamp (e.g., 506), but both accounts are stored within a common geo-domain. However, as indicated previously, a geo-domain may include any number of devices, therefore, while two stamps are within the same geo-domain, the two stamps may be stored on different devices and accessed by different processors.

The geo-domain 500 includes additional accounts, such as a computation account B in the stamp 3 510 and a storage account B in the stamp 514. In an exemplary embodiment, the accounts stored in the stamp 3 510 and the stamp 4 514 are associated with a user of the stamp 1 502 and the stamp 2 506. In an additional exemplary embodiment, the accounts stored in the stamp 3 510 and the stamp 4 514 are associated with a different user of the stamp 1 502 and the stamp 2 506. As previously discussed, the number of stamps located within a geo-domain is not limited to a specific number as indicated by the stamp N 520.

Figure 6:
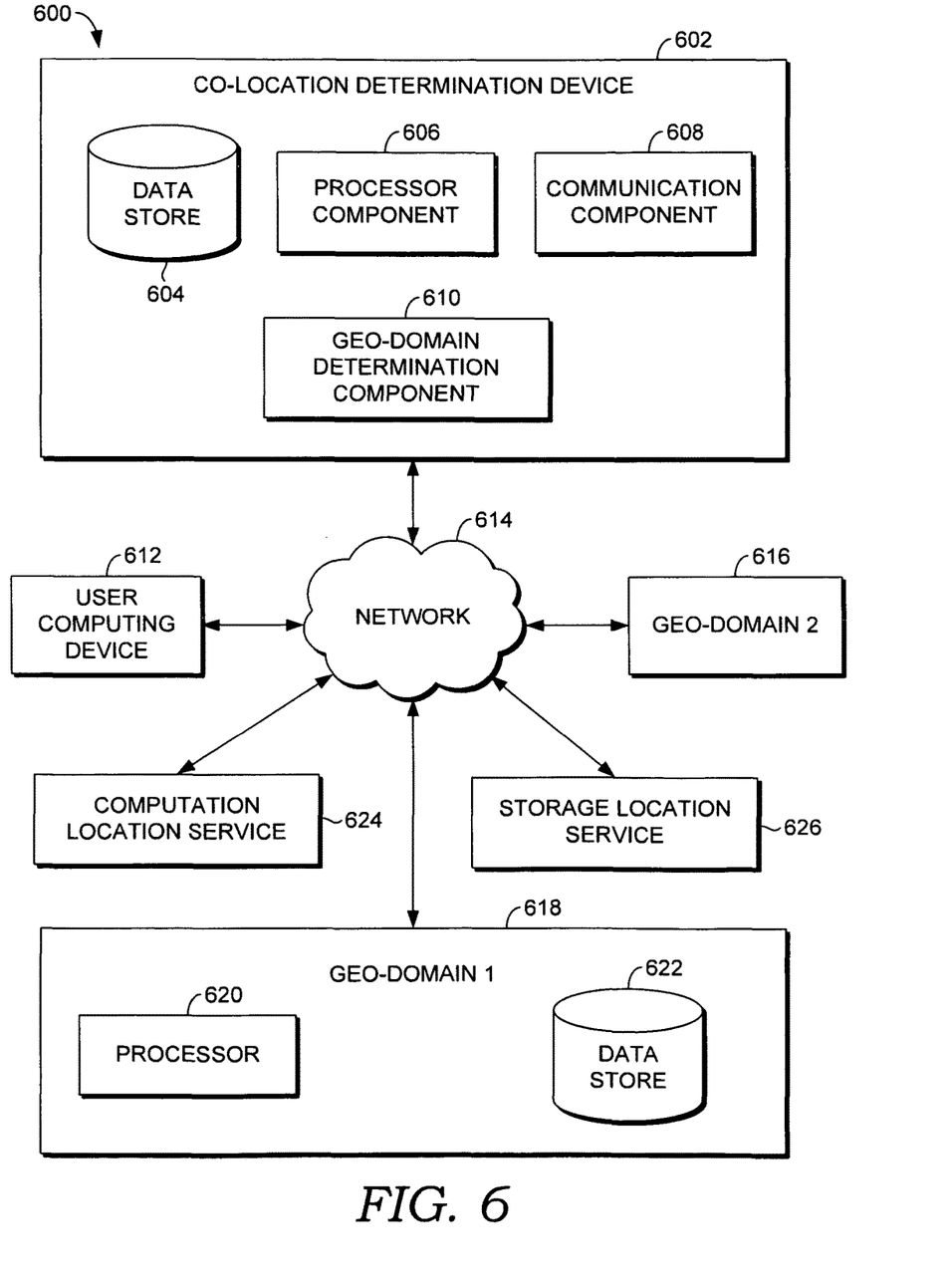
FIG. 6 depicts an exemplary environment for geographically organizing the storage of data and hosted services in a distributed computing environment, in accordance with embodiments of the present invention.

Turning to FIG. 6 that depicts an exemplary system 600 for geographically organizing the storage of data and hosted services in a distributed computing environment, in accordance with an exemplary embodiment of the present invention. The system 600 includes a co-location determination device 602, a network 614, a user computing device 612, a geo-domain 1 618, a geo-domain 2 616, a computation location service 624, and a storage location service 626.

It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 6 may be any type of computing device, such as computing device 100 described with reference to FIG. 1, for example. The components may communicate with each other via the network 614, which may include, without limitation, one or more local area networks (LANs) and/or wide area networks (WANs). Such networking environments are commonplace in offices, data centers, enterprise-wide computer networks, intranets, and the Internet. Additionally other components not shown may also be included within the system 600.

The co-location determination device 602 is comprised of a data store 604, a processor 606, a communication component 608, and a geo-domain determination component 610. The co-location determination device 602 is functional for determining a geo-domain in which an affinity group should be associated. In an additional embodiment, the co-location determination device 602 is functional for identifying a geo-domain to which an account should be hosted. Further, in an exemplary embodiment, a single co-location determination device 602 is functional for determining a geo-domain to which an account is to be stored across all geo-domains; therefore, the co-location determination device 602 may be a single point of determination across geo-domains. However, in an additional exemplary embodiment, two or more co-location determination devices may be implemented for determining a geo-domain to which an account is to be hosted. In an exemplary embodiment, a co-location determination device provides a co-location determination service.

In an exemplary embodiment, the co-location determination device 602 is functional to assign an affinity group with an associated geo-region allocation constraint to a geo-domain associated with the co-location determination device 602. Further, the co-location determination device 602 may be aware of the resources of the geo-domains, such as availability, capacity, usage, and potential. Therefore, the co-location determination device 602 may make a determination as to which geo-domain should be assigned to an affinity group based on affinity preference, hardware resources, and network traffic at a particular geo-domain. Examples of information that may be known to the co-location determination device include the number of computing devices (e.g., servers), the number of virtual machines, virtual IP address information, storage space, network traffic, and the like. In an exemplary embodiment, the co-location determination device 602 is provided information from the storage location service 626 and/or the computation location service 624.

The data store 604 is comprised of computer-readable media that is functional for reading and writing data, information, code, and the like. For example, the data store 604 may include a data structure that facilitates locating geo-domains, maintains information of the geo-domains, affinity group associations, user profiles, storage account information, computation account information, and other information to facilitate geographically organizing the storage of data and hosted services in a distributed computing environment.

The processor component 606 is a computing processor functional for controlling one or more features of the co-location determination device 602. In an exemplary embodiment, the processor component 606 is similar to the processor 114 of FIG. 1. The communication component 608 is a component functional to receive information. In an exemplary embodiment, the communication component 608 communicates by way of the network 614. For example, the communication component 608 is functional to receive information from a user (e.g., by way of the user computing device 612) and from a geo-domain (e.g., a location service). In an additional exemplary embodiment, the communication component 608 is functional to communicate with a user and a geo-domain. For example, a user using the user computing device 612 communicates a request to store a hosted service. The communication is received at the co-location determination device 602 by the communication component 608. In this exemplary embodiment, in order for the co-location determination device 602 to determine a geo-domain to assign to the account, the co-location determination utilizes information received from the computation location service 624 and/or the storage location service 626.

The geo-domain determination component 610 is a component functional for determining a geo-domain to which an affinity group is to be assigned. For example, information related to each geo-domain for which the co-location determination device 602 is responsible is analyzed to make a determination as to which geo-domain within a geo-region should be assigned to an affinity group. In an exemplary embodiment, the geo-domain determination component 610 performs a load balancing function to assign an affinity group to a geo-domain of a geo region based on the resource currently being used, potentially being used, and/or available at a potential geo-domain.

In an additional exemplary embodiment, the geo-domain determination component 610 identifies if another geo-domain is associated with an affinity group to which the user has requested adding another account. If a geo-domain is already associated with the affinity group, then the geo-domain determination component 610 may assign the geo-domain already associated with the affinity group as the location for storing the requested account.

In an exemplary embodiment, the co-location determination device 602 is functional to generate a co-location graph. A co-location graph is used in identifying a geo-domain to be used for storing one or more accounts. In an exemplary embodiment, a vertices of a co-location graph represents a geo-domain and the edges connecting the vertices represent the resource costs between the two vertices. For example, a co-location graph may be a weighted unidirectional graph with geo-domains as vertices and edges representing weighted distances that captures resource costs and latency between the geo-domains. In this example, two geo-domains would not be connected (e.g., have an edge value of infinity) if allocating affinitized accounts to the two geo-domains separately is not allowed.

The user computing device 612 is a computing device used by the user to access a distributed computing network. As used herein, a user is an entity that is the owner of a hosted service or an end-user of a hosted service. Therefore, in an exemplary embodiment, the user computing device 612 is used by an entity that owns a service being hosted at one or more geo-domains. In an additional exemplary embodiment, the user computing device 612 is a computing device used by an entity that is an end user of a hosted service that is physically stored at a geo-domain. In an exemplary embodiment, a user accesses a user interface for requesting a new account through the user computing device 612. In an additional exemplary embodiment, the user computing device is functional to communicate with a hosted service stored in a computation account. Therefore, in an exemplary embodiment, the user computing device 612 allows a user to communicate with a distributed computing network, including a hosted service and data stored in one or more accounts on a geo-domain.

The geo-domain 618 is a geo-domain that is functional to physically host one or more accounts. For example, the geo-domain 618 may store and provide access to a computation account that includes a hosted service and a storage account that includes data utilized by the hosted service. The geo-domain 618 is comprised of a processor 620 and a data store 622.

The processor 620 is a computing processor similar to the processor 114 of FIG. 1. In an exemplary embodiment, the processor 620 controls the data store 622. The data store 622 is a computer-readable media. The data store 622 may include one or more stamps. Each of the stamps located in the data store 622 may include an account, such as a computation account or a storage account. It is contemplated that the data store 622 includes a plurality of computer-readable media that are scalable to maintain reliability and requirements.

The computation location device 624 operates a service for providing resource information related to a geo-domain. The information may be related to geo-domain information or stamp information within a geo-domain. In an exemplary embodiment, the computation location service 624 is a service provided by a computation location service device (not shown) having a processor and memory. For example, the computation location service 624 may provide information to the co-location determination device related to the resources that may be assigned for use with a computation account. Additionally, the computation location service 624 is functional to manage the storing of a computation account at a stamp of the geo-domain 618. Further, the computation location service 624 is functional to create a computation account within the geo-domain 618. In an additional exemplary embodiment, the computation location service 624 is responsible for load balancing the resources of the geo-domain 618.

The storage location service 626 is a service for providing resource information for geo-domains and performing the assignment of a storage account to a storage stamp of an assigned geo-domain. In an exemplary embodiment, the storage location service 626 is a service provided by a service location service device (not shown) having a processor and memory. For example, the storage location service 626 may provide information to the co-location determination device related to the available geo-domains in a given geo-region and the resources that are available in those geo-domains. Additionally, the storage location service 626 is functional to manage the storing of a storage account at a stamp of the geo-domain 618. Further, the storage location service 626 is functional to create and/or delete a storage account within the geo-domain 618. In an additional exemplary embodiment, the storage location service 626 is responsible for load balancing the resources of the geo-domain.

The computation location service 624 and the storage location service 626 are visually depicted as separate services; however, the two services may be implemented as a single service. Therefore, the same results may be gained by a single service that performs multiple responsibilities.

An exemplary embodiment of the present invention includes a user accessing a distributed computing network to request the addition of a storage account and a computation account. The user accesses the distributed computing network by way of the user-computing device 612. The user's request is communicated through the network 614 to the co-location determination device 602. Upon receiving the request, the co-location determination device 602 identifies that the requested account is not associated with an affinity group. Had the requested account been associated with an affinity group, the requested account would have been assigned to the same geo-domain as previously used in conjunction with the affinity group in this embodiment. However, the requested account does not belong to an affinity group; therefore, the co-location determination component identifies a geo-region from one or more allocation constraints, such as a user provided preference for the Pacific Northwest geo-region. Upon determining the account will be stored in the Pacific Northwest geo-region, the co-location determination device 602 identifies a geo-domain within the selected geo-region.

The co-location device, in this exemplary embodiment, analyzes information provided by geo-domains, and in particular, from computation location service 624 and the storage location service 626, to identify an appropriate geo-domain for the account to be stored. For example, one or more geo-domains may be marked as full by a storage location service or a computation location service and therefore not available for allocation. The determination of the geo-domain may include the use of a weighted algorithm, referred to as a weighted coin-toss. The weighted coin toss may include a capacity factor that represents the worst case availability capacity of each resource of each geo-domain. Resources may include, but not be limited to, computing resources, storage resources, network resources, transaction resources, memory resource, etc. The capacity factor assumes that all previously stored accounts of a geo-domain reach a predefined threshold of capacity, and then the capacity factor assumes the requested account also reaches its predefined threshold of capacity. As a result, the capacity factor represents the load to which a given geo-domain will be subject. Upon determining the account will be stored at the geo-domain 618, the co-location determination device 602 requests one of the computation location service 624 or the storage location service 626 (depending on the type of account requested) to create the account within the geo-domain 618. The respective service (i.e., computation location service 624, the storage location service 626) then allocates the account to a stamp of the geo-domain 618. The determination by the service may take into consideration the available resource, such as bandwidth, of the stamps within the geo-domain 618.

In an additional exemplary embodiment, a stamp interface (not shown) is included within the system 600. The stamp interface is functional for interfacing with a fabric controller of the distributed computing network. For example, the stamp interface may communicate with a fabric controller associated with a computation stamp that stores a hosted service to which a user is accessing.

Accordingly, any number of components may be employed to achieve the desired functionality within the scope of embodiments of the present invention. Although the various components of FIG. 6 are shown with lines for the sake of clarity, in reality, delineating various components is not so clear, and metaphorically, the lines would more accurately be grey or fuzzy. Further, although some components of FIG. 6 are depicted as single blocks, the depictions are exemplary in nature and in number and are not to be construed as limiting.

Figure 7:
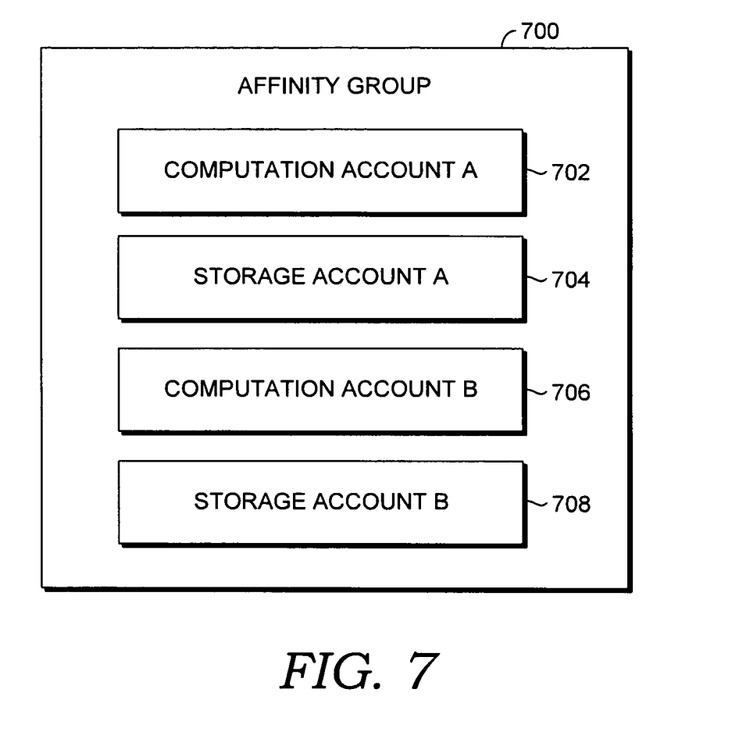
FIG. 7 depicts a block diagram illustrating an exemplary affinity group in accordance with embodiments of the present invention.

Turning to FIG. 7 that depicts a block diagram of an affinity group 700, in accordance with an embodiment of the present invention. The affinity group 700 is a grouping of a plurality of accounts, such as a computation account A 702, a storage account A 704, a computation account B 706, and a storage account B 708. In this exemplary embodiment, the computation accounts A 702 and the computation account B 706, while different accounts, share an affinity for a particular geo-region. Additionally, because both storage account and computation accounts may be included in a common affinity group, such as the affinity group 700, it is possible for a storage account and a computation account to be geographically organized in a distributed computing network to reduce latency, costs, and resources consumed. In an exemplary embodiment, a computation account and a storage account are treated in the same manner. Therefore, a distinction between a computation stamp and a storage stamp, in this exemplary embodiment, is not necessary.

It is contemplated that a user may be associated with a plurality of affinity groups. For example, a user that operates different hosted services from different geographic locations may benefit from having different affinity groups associated with each of two or more geo-regions.

Figure 8:
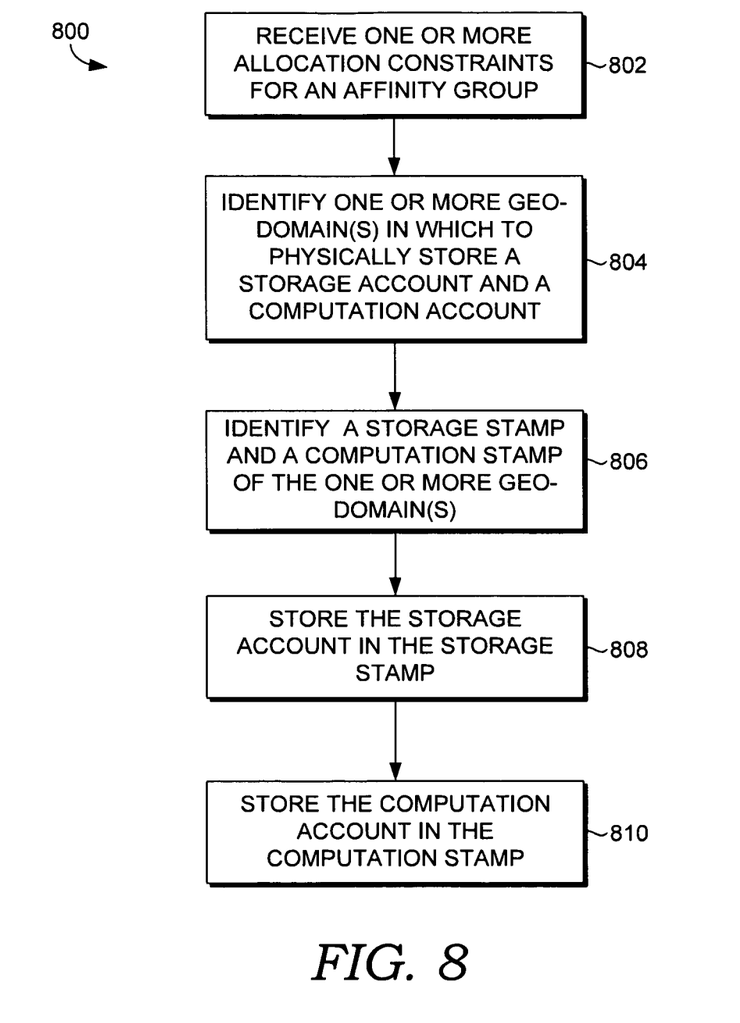
FIG. 8 depicts a method for organizing the storage of data and hosted services in a distributed computing environment in accordance with an embodiment of the present invention.

Turning to FIG. 8 that depicts a method 800 for geographically organizing the storage of data and hosted services in a distributed computing environment in accordance with an embodiment of the present invention. At a step 802, one or more allocation constraints are received for an affinity group. For example, a user may provide a preferred geo-region for the storage of a hosted service or related data. The preferred geo-region may be a constraint provided by a user. In an additional exemplary embodiment, an allocation constraint may include minimum performance requirements to service a particular geographic region. The reception of one or more allocation constraints may additionally include receiving the allocation constraints from a retrieved profile associated with an affinity group or a user. For example, if a request is received to add an account to an existing affinity group, the currently utilized geo-region for that affinity group may be received. In an additional exemplary embodiment, the allocation constraints are received at a co-location determination device.

At a step 804, a geo-domain is identified in which to host a storage account and a computation account. For example, based on an allocation constraint that was received at the step 802, a geo-region may be selected. As a result, a geo-domain within the selected geo-region is identified for storing an account. The selection of a geo-domain may be done by a co-location determination device. Additionally, in an exemplary embodiment, the identification of a geo-domain may include load balancing and fail over selection criteria. Further, in an exemplary embodiment, the storage account and the computation account are intended to be utilized in conjunction with one another to implement a hosted service on a distributed computing network (e.g., cloud computing environment). In an additional exemplary embodiment, the selection of the geo-domain may be done, at least in part, utilizing a weighted coin-toss algorithm to select an appropriate geo-domain within a geo-region.

At a step 806, a storage stamp and a computation stamp of the geo-domain are identified. For example, upon the selection of a geo-domain (or multiple geo-domains in an additional embodiment) in which the accounts are to be stored, a co-location detection device may request for a location service (e.g., storage location service, computation location service) to identify one or more stamps within the geo-domain that will be used for storing the accounts. In an exemplary embodiment, a load balancing and/or fail-over analysis is conducted by one or more services to assist in identifying a stamp for an account. Further, in an embodiment, a stamp for a storage account and a stamp for a computation account are identified on a common data store to further reduce resources consumed.

At a step 808, the storage account is stored in the storage stamp. For example, a storage stamp that was identified in the step 806 is allocated for the hosting of the storage account. A storage location service may be responsible for creating the storage account at the storage stamp. Additionally, the storage location service may be responsible for providing confirmation to a co-location detection device that the storage account has been created at a particular geo-domain. Further, a Domain Name Service (DNS) may be updated to reflect the association between the storage account and the storage stamp to provide efficient access to the data of the storage account. The DNS may be updated because of the defined nomenclature utilized by the system for storing a storage account.

In an exemplary embodiment, a storage account is registered with one or more storage stamps. The registration of a storage account with one or more storage stamps allows data associated with the storage account to be stored in the storage stamp. Additionally, the registration of a storage account with a storage stamp allows for the accessing of data of thee storage account at the storage stamp.

At a step 810, the computation account is stored in the computation stamp. For example, a computation stamp identified at the step 806 is used to host the computation account. In an exemplary embodiment, a computation location service is responsible for the creation of the computation account at the identified computation stamp. Additionally, the computation location service may provide a confirmation to a co-location determination device that the computation account has been created at the identified computation stamp. Further, a DNS may be updated to reflect the association between the computation account and the computation stamp to allow for efficient access to a hosted service associated with the computation account.

In an exemplary embodiment, a computation account is registered with one or more computation stamps. The registration of a computation account with one or more computation stamps allows data associated with the computation account to be stored in the computation stamp. Additionally, the registration of a computation account with a computation stamp allows for the accessing of data of thee computation account at the computation stamp.

Figure 9:
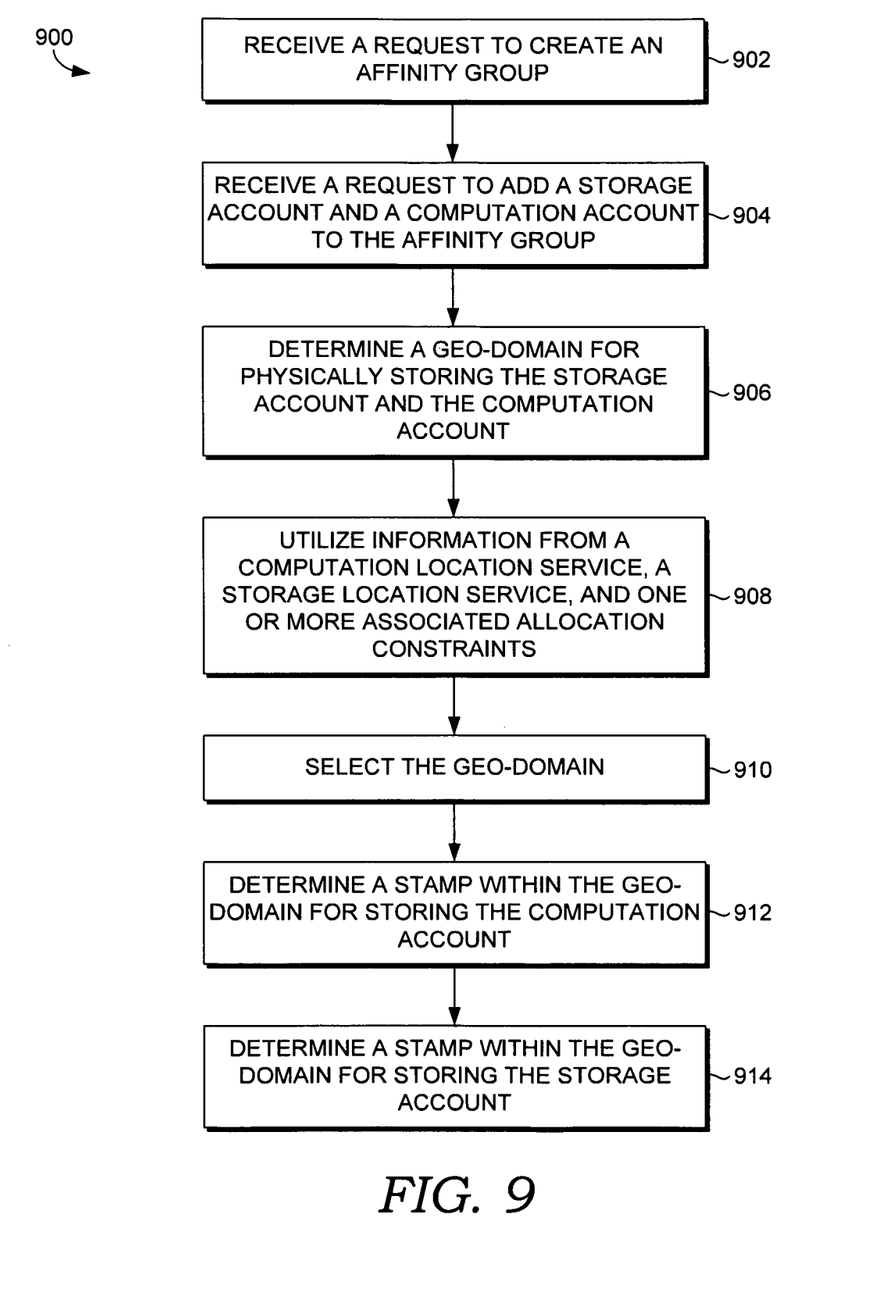
FIG. 9 depicts another method for organizing the storage of data and hosted services in a distributed computing environment in accordance with an embodiment of the present invention.

Turning to FIG. 9 that depicts a method 900 for organizing the storage of data and hosted services in a distributed computing environment, in accordance with an exemplary embodiment of the present invention. The method 900 may allow for a storage account and a computation account to be organized geographically such that the accounts are physically stored at a location that reduces the latency, costs, and resources consumed by co-located components, and latency experienced for a user to utilize a hosted service associated with the accounts. At a step 902, a request is received to create an affinity group. In an exemplary embodiment, the request is received from a user, such as a person, computing device, institution, business, or the like. The request may be received at a co-location detection device. In an exemplary embodiment, the request to create an affinity group is accompanied by a request for the storage of a storage account and a computation account. Additionally, the request to create an affinity group may include one or more allocation constraints, such as a preferred geo-region.

At a step 904, a request to add a storage account and a computation account to the affinity group is received. In an exemplary embodiment, the request to add a storage account and a computation account is communicated by a user that requested the creation of an affinity group. However, in an alternative embodiment, the request to add a storage account and a computation account is provided by an alternative user, such as an employee of a business that requested the affinity group. The request to add a storage account and a computation account may be received at a co-location detection device.

At a step 906, a geo-domain is determined for physically storing the storage account and the computation account. For example, based on a geo-region associated with the affinity group, a number of geo-domains are analyzed to identify the geo-domain in which the storage account and the computation account will be stored. In an exemplary embodiment, the geo-domain is identified by a co-location detection device. The co-location detection device, in an embodiment of the present invention, utilizes information provided by a computation location service, a storage location service, and one or more allocation constraints, as depicted at a step 908.

At a step 910, a geo-domain is selected for storing the storage account and the computation account. In an exemplary embodiment, the geo-domain that is selected at the step 910 is the geo-domain that was determined at the step 906.

At a step 912, a stamp within the selected geo-domain is determined to be a stamp for storing the computation account. In an exemplary embodiment, the determination is made by a computation location service of the geo-domain. In an additional embodiment, the determination is made taking into consideration the location of one or more accounts in the same affinity group. Further, in an additional embodiment, the computation account is created in the determined stamp; therefore, the information of the computation account may be stored within the account at the stamp.

At a step 914, a stamp within the selected geo-domain is determined to be a stamp for storing the storage account. In an exemplary embodiment, the determination is made by a storage location service of the geo-domain. In an additional embodiment, the determination is made taking into consideration the location of one or more accounts in the same affinity group. Further, in an additional embodiment, the storage account is created in the determined stamp; therefore, the information of the storage account may be stored within the account at the stamp.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method utilizing a computing processor and memory for geographically organizing the storage of data and hosted services in a distributed computing environment, the method comprising:
   receiving one or more allocation constraints for an affinity group, the affinity group being a grouping of storage accounts and computation accounts with an assigned affinity;
   identifying, based in part on the one or more allocation constraints and a weighted coin-toss accounting for a worst-case capacity of resources at different geo-domains, a geo-domain for access to an account from the geo-domain and for physical storage of the account, the account being associated with the affinity group, the account comprising a storage account for storing data used in association with the hosted service and a computation account for storing code of the hosted service;
   identifying a stamp of the geo-domain; and
   storing the account in the stamp,
   wherein the worst-case capacity of resources is defined as a maximum resource load to which a given geo-domain would experience when all currently stored accounts at the geo-domain maximize a measured resource.

2. The method of claim 1, wherein the one or more allocation constraints include an allocation constraint that is a preferred geo-region.

3. The method of claim 1, wherein identifying the geo-domain includes analyzing available resources in one or more geo-domains of a geo-region.

4. The method of claim 1, wherein identifying the geo-domain includes identifying resources currently used by the affinity group.

5. The method of claim 1 further comprises generating a co-location graph, wherein the co-location graph consists of vertices representing one or more geo-domains and edges between the vertices representing resource costs between two geo-domains.

6. The method of claim 1, wherein the identifying a geo-domain is performed by a co-location determination device.

7. The method of claim 1, wherein the stamp is two or more stamps.

8. The method of claim 1, wherein identifying a geo-domain further comprises identifying a first geo-domain in which to physically store the storage account and identifying a second geo-domain in which to physically store the computation account.

9. The method of claim 8,
   wherein identifying a stamp of the geo-domain comprises identifying a storage stamp of the first geo-domain and identifying a computation stamp of the second geo-domain; and
   wherein storing the account at the geo-domain comprises storing the storage account in the storage stamp and storing the computation account in the computation stamp.

10. The method of claim 9, wherein identifying the computation stamp uses a computation location service to identify the computation stamp within the geo-domain and wherein identifying the storage stamp uses a storage location service to identify the storage stamp within the geo-domain.

11. The method of claim 9, wherein the storage stamp and the computation stamp are the same stamp.

12. The method of claim 1, wherein the worst-case capacity of resources is a measure of availability capacity at a geo-domain of at least one resource selected from:
   computing resources,
   storage resources,
   network resources, or
   memory resource.

* * * * *